Patented Apr. 18, 1950

2,504,407

UNITED STATES PATENT OFFICE 2,504,407

HYDRODEMETHANOLIZATION

William F. Gresham, Wilmington, Del., assignor to E. I. du Pont de Nemours & Company, Wilmington, Del., a corporation of Delaware No Drawing. Application March 28, 1947, Serial No. 738,006

6 Claims. (Cl. 260—615)

This invention relates to hydrodealkanolization and more particularly, the hydrodemethanolization of 3,4-dimethoxy aliphatic carboxylic acid esters to glycol ethers.

An object of the invention is to provide a process of preparing glycol ethers. Another object is to provide a process for the preparation of alkoxy-substituted long chain aliphatic alcohols by a dual reaction involving simultaneously, the dealkanolization and hydrogenation of 3,4-dialkoxy-substituted carboxylic acid esters. A more specific object is to provide a process for the hydrodemethanolization of methyl 3,4-dimethoxy butyrate to 4-methoxybutanol-1. Other objects and advantages of the invention will hereinafter appear.

In accord with the invention, it has been found that 3,4-dialkoxy carboxylic acid esters, when hydrogenated in the presence of a suitable hydrogenation catalyst under elevated temperature and pressure, are, during the reaction, not only hydrogenated but also decomposed to the extent of losing an alcohol group whereby the substituted ester is converted to an alkoxy-substituted alcohol. Generically, the reaction may be illustrated by this equation:

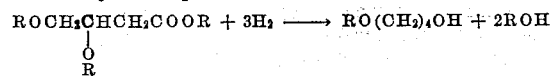

in which the R group may be similar or dissimilar alkyl groups such as, methyl, ethyl, normal and isopropyl, normal and isobutyl, and the higher alkyl groups; aryl or aralkyl groups may likewise be used. With methyl substituted in all R positions, the equation illustrates the hydrodemethanolization of methyl 3,4-dimethoxybutyrate to 4-methoxybutanol-1 with methanol as the alcohol split off during the reaction.

The esters which are hydrodealkanolized in accord with the invention are prepared in accord with the reaction:

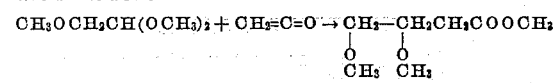

wherein 1,1,2-trimethoxyethane reacts with ketene to form methyl 3,4-dimethoxybutyrate, more specifically described in the Brooks United States application S. N. 696,935, filed September 13, 1946, now Patent 2,449,447. Generally the ester formation reaction is conducted at a relatively low temperature which may range between —10 and +10° C., the temperature of the reaction inter alia depending on the nature and activity of the acid catalyst employed. The 1,1,2-trialkoxyalkane, after addition of the catalyst, is cooled to the desired temperature of the reaction, ketene vapors introduced into the mixture by bubbling, diffusion or by other suitable means until no further ketene is absorbed.

Methyl 3,4-dimethoxybutyrate may be prepared in this manner: Ketene vapors (ca. 1 mol) are passed during 5.6 hours through a stirred solution of 44.0 g. of 1,1,2-trimethoxyethane, $CH_3OCH_2CH(OCH_3)_2$, 6 cc. of an equimolar $BF_3$-dimethyl ether complex and 150 cc. of anhydrous ether. The solution, which is maintained at 1–2° C. by external cooling, gradually darkens to a brown color. The product is made basic to wet litmus paper by the addition of methanolic sodium methylate and distilled at reduced pressure. The conversion of the trimethoxyethane to a (5° boiling range) methyl 3,4-dimethoxybutyrate fraction is around 89% (52.8 g.). Pure methyl 3,4-dimethoxybutyrate boils at 55° C./3.5 mm. or 73.8°/8 mm. and has a refractive index ($N_D^{25°}$) of 1.4155. It is soluble in water and the common organic solvents.

The hydrodemethanolization is conducted by subjecting the 3,4-dialkoxy carboxylic acid esters to hydrogenation conditions in the presence of a suitable hydrogenation catalyst. The product, which may be separated by fractional distillation, is not, as would be expected, a dimethoxybutanol, but, on the contrary a monomethoxy-substituted normal alcohol, one of the methoxy groups being detached during the reaction, and the ester group being converted to a hydroxyl group during the reaction.

The examples illustrate preferred embodiments of the invention in which parts are by weight unless otherwise indicated.

*Example 1.*—A charge of 40 g. of methyl 3,4-dimethoxybutyrate $$(CH_3OCH_2CH(OCH_3))CH_2COOCH_3$$

boiling at 73.8°/8 mm. or 55°/3.5 mm., having a refractive index at 25° of 1.4155), 120 g. of methanol, and 10 g. of 8–14 mesh 1 Cu-1 Cr —0.1 Mg. catalyst prepared by precipitating a copper nitrate, chromic acid solution with ammonia, filtering, drying and kneading the dried precipitate with magnesium and pilling and igniting the resulting mixture and was placed in a copper-lined shaker tube of 325-cc. capacity and processed at 270–305° C. for one hour under a hydrogen pressure of 350–740 atmospheres. The product was discharged, filtered, and distilled, giving 19.7 g. (77% conversion and yield) of product boiling at 59–63°/7 mm., the major part of this material had a refractive index of 1.4189/25° and an additional 5.4 g. boiling above 66°/8 mm. The conversion and yield to 4-methoxybutanol-1,

CH₃OCH₂CH₂CH₂CH₂OH by hydroxyl analysis, was 91%.

The fraction which boiled at 63°/7 mm. and had a refractive index at 25° of 1.4172 had a hydroxyl number of 512.8, 509.4 (vs. 540 calc. for 4-methoxybutanol-1), contained 29.7% methoxyl (vs. 29.8% calc. for 4-methoxybutanol-1), and was shown by melting points and mixed melting point of the 3,5-dinitrobenzonates to be identical with a sample of 4-methoxybutanol-1 prepared from dimethyl sulfate and 1,4-butanediol. The authentic sample of 4-methoxybutanol-1 had a refractive index at 25° of 1.4192.

*Example 2.*—A charge identical with the charge of Example 1, but without methanol, was processed in a copper-lined shaker tube at 310–312° C. for 15 minutes at a hydrogen pressure of 510 to 700 atmospheres. The product was filtered and distilled, giving 19.5 g. (76% yield) of 4-methoxybutanol-1.

*Example 3.*—A charge of 9 g. of precipitated 1 copper chromite-0.1 barium chromite catalyst, 40 g. of methyl 3,4-dimethoxybutyrate, and 120 g. of methanol was processed in a Cu-lined shaker tube at 300–305° C. for 46 minutes at a hydrogen pressure of 575 to 700 atmospheres, and analyzed as in the previous examples, giving a conversion and yield to 4-methoxybutanol-1 of 74%.

*Example 4.*—A charge of 15 g. of powdered, precipitated 1 Cu-1 Cr-0.04 Mg catalyst, 40 g. of methyl 3,4-dimethoxybutyrate, and 120 g. of methanol was processed in a copper-lined shaker tube at 300–310° C. for thirty minutes at 600–700 atmospheres hydrogen pressure. The product was filtered and distilled, giving a 51% conversion and yield to 4-methoxybutanol-1.

While the examples illustrate specific conditions under which the hydrodealkanolization reaction may be conducted, the invention is not strictly limited thereby for the reaction may be conducted in the presence of any suitable hydrogenation catalyst, such as the copper chromite, the most effective hydrogenation catalysts found being, copper chromite promoted with magnesium, barium, or other alkaline earth metal, or copper chromite promoted with an alkali metal, such as sodium, potassium etc.

The reaction is carried out at a temperature ranging between 200 and 350° C., and more particularly between 270 and 310° C. Pressure is preferably used and may vary between 1 and 1500 atmospheres or higher with the more acceptable range above 10 and especially between about 200 and 900 atmospheres.

While the reaction is generally conducted in the absence of the solvent, for under such conditions excellent conversions have been realized, nevertheless, solvents may be present, such for example, as the lower aliphatic alcohols, methanol, ethanol, propanol or other organic solvents of the esters that are not decomposed or are not hydrogenated during the reaction. When such solvents are used they may be added to give a solution containing at least 10% of the ester to be treated.

The reaction product is filtered to separate the catalyst and the filtrate subjected to distillation for separating any solvent used from the methoxy-substituted alcohol formed, and likewise, for the separation of any ester which has not been hydrodealkanolized during the reaction from the desired product.

The process may be carried out by way of a continuous procedure as distinguished from a batchwise procedure. When the process is so operated the ester and the catalyst, together with the solvent if one is used, are introduced continuously into a reaction zone which may, for example, be a cylindrical converter with a ratio of length to diameter of greater than about 10:1. The converter may be charged with a catalyst over which the ester and hydrogen are passed or, contrariwise, a catalyst may be mixed with the ester with or without solvent, and the resulting mixture passed through the converter which is maintained under the temperature and pressure conditions hereinbefore described, the products issuing from the converter being continuously filtered and the filtrate passed continuously to a fractionating column for separating the alcohol formed.

I claim:

1. In a process for the preparation of a 4-alkoxybutanol-1 by the hydrodealkanolization of 3,4-dialkoxy-substituted aliphatic monocarboxylic acid esters, the step which comprises subjecting such an ester to hydrogenation as illustrated by the equation:

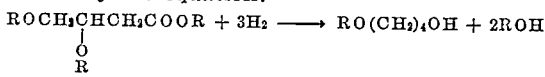

in which R is a lower alkyl group, the reaction being conducted at a temperature of 200 and 350° C. at a pressure above 10 atmospheres and in the presence of a hydrogenation catalyst.

2. The process of claim 1 in which the reaction is conducted at a temperature between 270 and 310° C. and at a pressure between 200 and 900 atmospheres.

3. The process of claim 1 conducted with copper chromite promoted with an alkaline earth metal as the catalyst.

4. In a process for the preparation of 4-methoxybutanol-1 by the hydrodemethanolization of an alkyl 3,4-dimethoxy butyrate, the step which comprises subjecting an alkyl 3,4-dimethoxy butyrate to hydrogenation at a temperature between 200 and 350° C., under a pressure of approximately 800 atmospheres and in contact with a copper-chromium hydrogenation catalyst.

5. The process of claim 4 conducted at a temperature between 270 and 310° C. and under a pressure between 200 and 900 atmospheres.

6. The process of claim 4 in which the catalyst is promoted with an alkaline earth metal.

WILLIAM F. GRESHAM.

REFERENCES CITED

The following references are of record in the file of this patent:

UNITED STATES PATENTS

| Number | Name | Date |
|---|---|---|
| 2,357,479 | Loder et al. | Sept. 5, 1944 |
| 2,397,514 | Staff | Apr. 2, 1946 |